No. 673,069. Patented Apr. 30, 1901.
H. W. WILEY.
METHOD OF TREATING VEGETABLE MATTERS.
(Application filed Feb. 21, 1898.)
(No Model.)
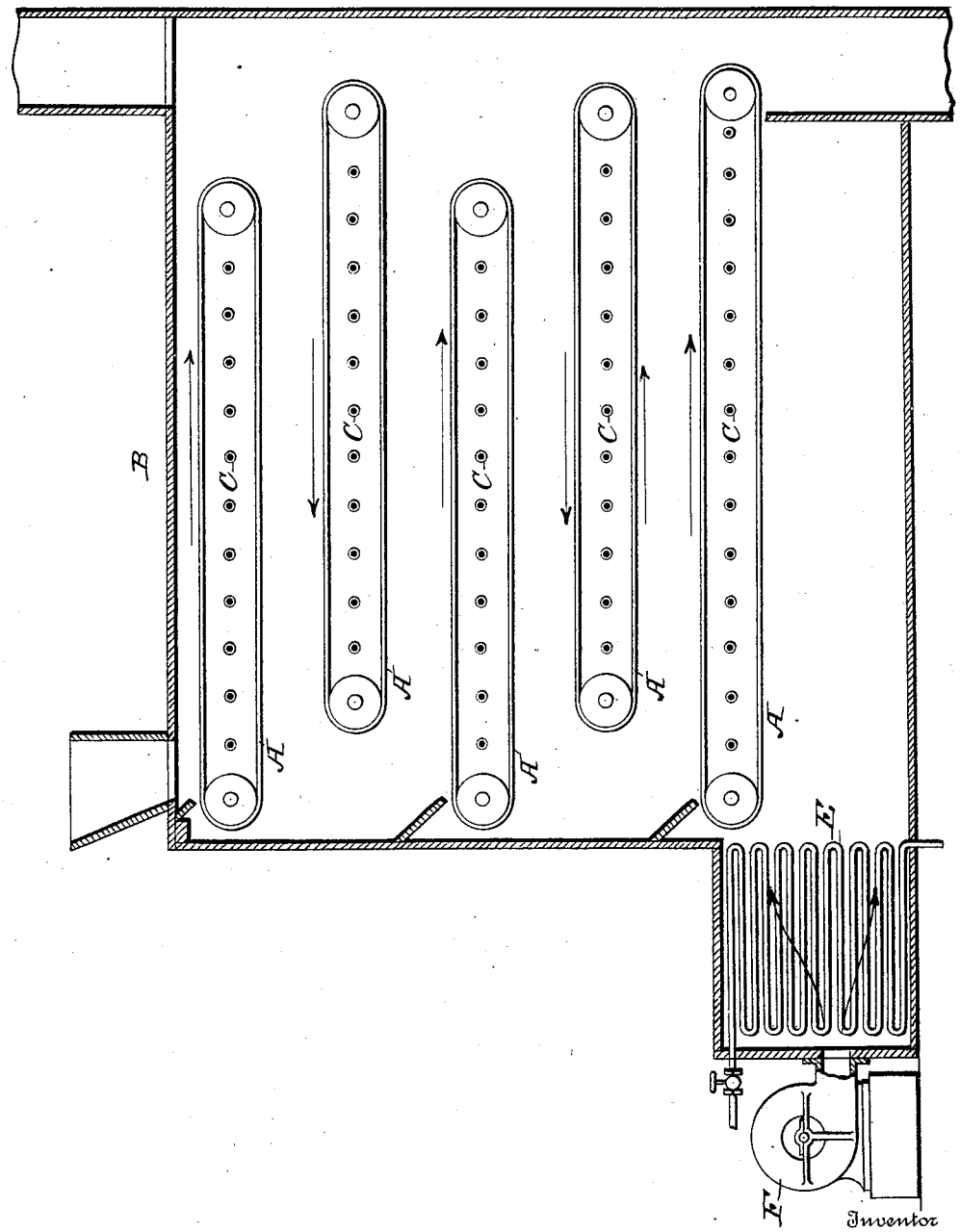
Witnesses
Inventor
Harvey W. Wiley
By Foster + Freeman
Attorneys

UNITED STATES PATENT OFFICE.

HARVEY W. WILEY, OF WASHINGTON, DISTRICT OF COLUMBIA, ASSIGNOR OF ONE-HALF TO THE MARSDEN COMPANY, OF PHILADELPHIA, PENNSYLVANIA.

METHOD OF TREATING VEGETABLE MATTERS.

SPECIFICATION forming part of Letters Patent No. 673,069, dated April 30, 1901.

Application filed February 21, 1898. Serial No. 671,177. (No specimens.)

*To all whom it may concern:*

Be it known that I, HARVEY W. WILEY, a citizen of the United States, residing in the city of Washington, District of Columbia, have invented certain new and useful Improvements in Methods of Treating Vegetable Matters, of which the following is a specification.

Attempts have been made from time to time to preserve vegetable matters by desiccating or treating with preservative substances, &c.; but in most, if not all, instances the flavor, color, or odor is destroyed in whole or in part and valuable qualities are impaired or lost. To a great extent this results from the fact that in many modes of treatment the water is completely evaporated or expressed.

I have discovered that it is possible to preserve the saccharine and other valuable properties of vegetable matters and to also preserve the odor, color, and flavor by first sterilizing the material, (properly comminuted, when necessary,) but without desiccation, and then compressing the mass into a block, layer, or bale, in which the particles are held so intimately together as not to be affected deleteriously by germs.

I may carry out my invention in connection with many vegetable products—as Indian corn, sorghum, and various fruits and vegetables, as potatoes, apples, or beans, and with cereals or with flour made from cereals.

In the accompanying drawing the figure is a vertical sectional view of one form of apparatus by means of which the invention may be carried out.

In the treatment of such vegetable matters as the stalks of Indian corn, sorghum, or sugar-cane the period of harvest is preferably selected when the sugar content is most abundant; in the case of cereals at the time of harvesting the ears for the green-corn market or at a slightly-later period when the starch in the grains is hard. If the ears are harvested at this time and cured in small piles, the weight is greater and the grains fuller than when allowed to become fully dry on the stalk. My process does not therefore interfere with the saving of the crop of grain for any purpose whatever and is applicable to the grain as well as to the stalk. When the final product is to be used for cattle-food or for the manufacture of alcohol, it is not necessary to gather the ears; but they may be incorporated with the other preserved particles, and will thus retain their maximum value as food or as a source of alcohol. When the object is to prepare cattle-food or even to make alcohol, it is not advisable to remove the blades of the stalks or even the husks of the ears before submitting the harvested materials to the next process. The stalks are next subjected in any suitable apparatus to a shredding process, by which they are reduced to as fine a state of subdivision as desirable. Preferably the comminution is carried on until the particles are extremely fine. This product I term the "pulp." The pulp is delivered to a sterilizing apparatus so constructed as to keep the whole mass for a sufficient length of time at or near a temperature of 212° Fahrenheit. I prefer for this purpose to deliver the pulp on an endless apron of metal or other suitable material, by which it is carried into a closed chamber heated by steam-pipes or otherwise. In passing through this chamber a portion of the moisture is volatilized and may be conducted away by a current of air. Since the air carries germs which might escape destruction in rapidly passing through the drier, I prefer to use air heated to a temperature of boiling water for this purpose. This sterilized air is heated by passing over a series of steam-coils or by any other convenient method, and is forced into the sterilizing-oven by a blower or other convenient means. The pulp should remain in the sterilizer long enough to secure the destruction of such germs as would promote decomposition, and this is accomplished as soon as every part has approximated the temperature of boiling water. The form of the sterilizing oven, the temperature of the steam-coils, and the rate of motion of the endless apron will determine this point. For the sake of economy of heat this part of the process should not be continued longer than is necessary to secure complete sterilization; and it should also secure the evaporation of so much moisture that none will be expelled by subsequent pressure. After sterilization the pulp is not absolutely dry, but retains sufficient moisture to preserve the color, odor, and flavor of the material and to be compacted under pressure. In order to secure the compression in a sterilized atmosphere, and thus avoid the entrance of any germs, the sterilized pulp is next delivered to a compressor, preferably contained in a chamber at a temperature of boiling water or provided with an interior steam service which maintains those parts of it coming in contact with the hot pulp approximately at the temperature of boiling water, and is thereby compressed or consolidated into blocks, bales, or layers of suitable form and size.

In the treatment of cereals comminution is not absolutely necessary, as the grains partially dried after sterilization (which destroys all surface germs) may be directly compressed, thereby destroying any eggs of insects or other organisms or germs that may be on the inside portions of the grains, the pressure compacting the mass.

In treating sugar-cane to make sugar it is common to cut off and throw away the upper portion, which contains so large a proportion of glucose that it interferes with the crystallization of the sugar. In this way one-fifth or one-sixth of the total weight of the cane is wasted. The discarded material may be utilized as above described, or the entire stalk can be treated and preserved to be used for making alcohol or cattle-food.

Since many non-fibrous food products, like potatoes, apples, beans, &c., would lose particles from their surfaces after being pressed into blocks, I in some cases place in the press sterilized cotton or other cloth large enough to cover the mass, and which forms a protection to it when the blocks or bales are removed from the press. This cloth also tends to prevent the ingress of germs or spores from the air. Food materials prepared in this way occupy the smallest possible space, and are thus particularly well suited for provisioning ships, mining and lumber camps, and for army-rations. The masses of food matter being thoroughly sterilized are free from any danger of fermentation or decay. When ready for use, they are comminuted and mixed with water or other appropriate liquid, and the original flavor of the material is at once restored. Another step which is often advantageous consists in subjecting the surface of each bale or block to a final sterilization and superficial drying. This is accomplished by placing them for a few moments in a chamber heated to a sterilizing temperature. The surface is thus dried and resterilized. I have found that the sterilized and dried fiber of Indian-corn stalks, sorghum, &c., or the cotton covering of potatoes, apples, or other non-fibrous materials has the same properties as are possessed by cotton of being able to stop the passage of germs through them. The bales of sterilized pulp prepared as above are thus surrounded with a dried sterilized layer of cellulose and cellulose-like material, which interposes a complete barrier to the entrance of fermentative germs to the more moist sterilized material of the interior. The pulp, therefore, keeps perfectly fresh for an indefinite time and is ready for use for any of the purposes above named or for similar purposes whenever the retaining-bands or integuments are cut.

I am aware that attempts have been made to produce compressed cakes of bran, oil-cake, tanbark, cotton, or other materials by heating and subsequently pressing said materials; but in no case has the heating been effected in a manner to secure entire sterilization, and the pressure has to be effected in apparatus unsterilized or incapable of preventing the entrance of germs, while in my process the pressure is effected in a sterilized atmosphere and in a sterilized apparatus. Moreover, in said old processes the material is dried, which deprives the same of its flavor, which can never be restored, while my process insures sufficient moisture to preserve the flavor.

I claim—

1. The method of treating vegetable products, which consists in completely sterilizing the material without causing evaporation of all the moisture therefrom, compressing the moist and sterilized product into a compact mass in a sterilized atmosphere, and making the surfaces of the compressed mass proof against the entrance of fermentative germs, substantially as described.

2. The method of treating vegetable products, which consists in thoroughly sterilizing the material without causing evaporation of all the moisture therefrom, and compressing the moist and sterilized resulting material into a compact mass while in a sterilizing medium, substantially as described.

In testimony whereof I have signed my name to this specification in the presence of two subscribing witnesses.

HARVEY W. WILEY.

Witnesses:
G. L. SPENCER,
M. S. TIDD.